J. G. GOODHUE.
NOZZLE DEVICE.
APPLICATION FILED FEB. 7, 1911.
1,059,293.
Patented Apr. 15, 1913.
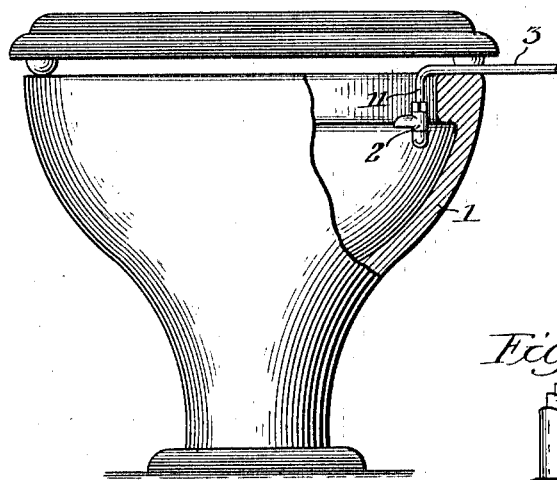
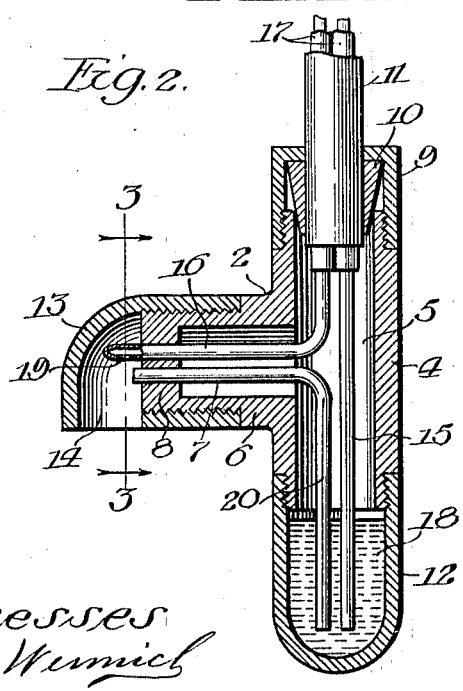
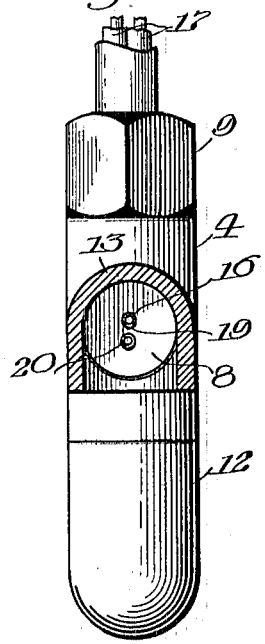
Witnesses
Inventor
Julian G. Goodhue

UNITED STATES PATENT OFFICE.

JULIAN G. GOODHUE, OF CHICAGO, ILLINOIS.

NOZZLE DEVICE.

1,059,293.  Specification of Letters Patent.  Patented Apr. 15, 1913.

Original application filed February 23, 1910, Serial No. 545,390. Divided and this application filed February 7, 1911. Serial No. 607,110.

*To all whom it may concern:*

Be it known that I, JULIAN G. GOODHUE, a citizen of the United States, residing at Chicago, in the county of Cook and State of Illinois, have invented a certain new and useful Improvement in Nozzle Devices, of which the following is a full, clear, concise, and exact description, reference being had to the accompanying drawings, forming a part of this specification.

My invention relates to nozzle devices, that is to say apparatus or devices for spraying or ejecting liquid or other substance.

The principal objects of invention are to provide a simple, practical and inexpensive device of this kind having certain features of advantage and efficiency, and to arrange for the application of the same to a lavatory device or bowl.

This application is a division of an application filed by me February 23, 1910, Serial No. 545,390, disinfectant apparatus.

In the accompanying drawings Figure 1 is a lavatory bowl or device having a nozzle device embodying my invention applied to it. Fig. 2 is a vertical section of said nozzle device, and Fig. 3 is a view of said device partly in elevation, and partly in section, taken on line 3—3 in Fig. 2.

In Fig. 1 I have shown a lavatory bowl 1, having a nozzle device 2 embodying my invention applied to it. I find it a convenient arrangement to have this nozzle device 2 applied at one side or the rear of the bowl, and supported in proper position near the top thereof by a member 3 passing up from the device 2 and rearwardly over the top edge of the bowl 1 and resting upon the latter.

The device 2 comprises a central hollow member 4 having an interior bore or chamber 5 and a horizontally projecting portion 6 having a bore or cross chamber 7, the end of which is closed by the end portion 8 of said member 4. An upper member 9 in the form of a cap is screw threaded upon the top of the member 4, and a plug 10 is fitted within this cap 9 and arranged to be screwed or wedged down into place by the action of the cap 9. A tubular member 11 passes through the cap 9 and the plug 10 into the interior of the member 4, and this tubular member 11 is held in place by the members 9 and 10, member 11 being clamped by member 10 when the latter is wedged down into place as the cap 9 is screwed down. A lower or bottom member 12 is detachably secured to the bottom of the central member 4, as for example by screw threading it thereto, this bottom member 12 being in the form of a cup forming a receptacle or chamber below the bore or chamber 5. A nozzle or spout 13 is detachably secured to the projecting portion 6 of the member 4, as by screw threading said nozzle on said cross projection 6. The nozzle 13 opens downwardly through the mouth or orifice 14. The device is shown having pipes 15 and 16 leading down through the tubular member 11, being conveniently incased in tubular protecting coverings 17—17 within the member 11, which latter when the device is applied to a bowl as shown in Fig. 1, may be bent sidewise to form the supporting member 3 shown in said Fig. 1. The pipe 15 extends down in the chamber 5 to substantially the bottom of the cup member 12, and this pipe 15 is intended as a liquid supply pipe for supplying liquid 18 to the cup 12, which liquid it is understood, is to be sprayed or ejected from the device. This pipe 15 is understood to be connected to a liquid supply apparatus of some sort for continually and properly feeding or supplying liquid to the reservoir or cup member 12. The pipe 16 is bent and extended through the lateral projection 6 into the open outlet or orifice 14 of the nozzle 13, and said pipe is provided with an aperture 19 opening downwardly into the orifice 14. This pipe 16 may be called a pneumatic or air jet pipe, and is intended to supply compressed air or an air jet at proper times to operate the device. There is a third pipe 20 arranged within the chamber 5 and extended down substantially to the bottom of the reservoir member 12, and also extended horizontally through the end portion 8 and opening into the orifice 14 below the air jet pipe opening 19. This pipe 20 is to convey liquid from the reservoir 12 to the nozzle for the spray.

The operation of the device is that when desired an air jet or quantity of air under pressure is sent through the tube or pipe 16 and when this is done this air will emerge from the opening 19 and pass across the open end of the tube 20, thereby creating suction in said tube and drawing liquid 18 up from the reservoir 12 and causing the same to be ejected or sprayed out of the orifice 14. When the device is located in a bowl, as shown in Fig. 1, or similarly, this liquid will be sprayed or ejected into the bowl so that by supplying a disinfecting liquid to the device an efficient disinfecting operation is secured. This operation of the device is brought about from time to time as may be desired by suitable air jets in any preferred or suitable way. The liquid which is withdrawn from the reservoir 12 will be replaced so as to keep a constant supply of liquid in the reservoir to enable the device to operate properly.

It will be understood that changes and modifications can be made without departing from the spirit of the invention.

What I claim is:

1. An atomizing apparatus comprising in combination, a vertically disposed tubular portion provided with a reservoir chamber, a side nozzle projecting from said tubular portion above said reservoir chamber, an air tube leading from outside of the device into the same and into the nozzle thereof, a supply tube leading from outside the device into the reservoir chamber, and a reservoir tube leading from the reservoir chamber to and arranged for use in connection with the air tube, said nozzle being constructed to inclose said air and reservoir tubes on all sides except for one point where the under side of the nozzle is cut away to form an aperture, said air tube being provided with an outlet aperture which immediately overlies the aperture in said nozzle whereby a spray may be projected downwardly through said nozzle aperture.

2. A device of the class specified, comprising a body member, a detachable top for the same, a detachable bottom adapted to form a reservoir, and a nozzle detachably secured to said body portion.

3. A device of the class specified, comprising a body member 4, a cap 9 for the same, a detachable reservoir member 12, detachably secured to the bottom of the member 4, and a detachable nozzle 13 detachably secured to the body member 4.

4. A device of the class specified, comprising a body member 4, a cap 9 for the same, a detachable reservoir member 12, detachably secured to the bottom of the member 4, and a detachable nozzle 13 detachably secured to the body member 4, a reservoir supply pipe 15 leading from outside of the device into the interior thereof for supplying the reservoir, an air jet pipe 16 also leading from outside of the device to the interior thereof and terminating in the orifice of the nozzle 13, and a reservoir pipe 20 extended from the reservoir to the nozzle 13 and terminated adjacent to the opening of the air pipe 16.

5. A device of the class described, comprising a body, a projecting nozzle carried by said body, a reservoir detachably secured to said body, a cap detachably secured to said body, a pipe passing through said cap, and means for supporting said cap on said pipe.

6. A device of the class described, comprising a body having a reservoir portion, a projecting nozzle carried by said body, a detachable cap for said body, a tube passing through said cap into said nozzle and a tube leading from said reservoir portion into said nozzle.

7. A device of the class specified, having a vertically disposed tubular body structure, provided with a reservoir chamber at or near its lower end, and a side nozzle projecting from said body structure above the reservoir portion thereof, and pipes entering the upper end of said body structure, one of said pipes extending to the reservoir, and the other to the nozzle, and another pipe extending between the reservoir and nozzle and having its end associated with the end opening of the aforesaid nozzle pipe.

8. A device of the class specified, having a vertically disposed tubular body structure, provided with a reservoir chamber at or near its lower end, and a side nozzle projecting from said body structure above the reservoir portion thereof, and one or more pipes entering the upper end of said body structure serving as a support for the device.

9. A device of the class specified, comprising a tubular body having a lateral tubular projection, a cup shaped member detachably secured to the bottom of said tubular body to serve as a reservoir, a reservoir pipe having one end located in said cup shaped member and extending up from the same and bent to extend into said lateral projection, and an air blast pipe extending into said tubular body and also bent to extend into said lateral projection, and provided with a discharge orifice to coöperate with the discharge orifice of the reservoir pipe.

10. A device of the class specified, comprising a tubular body having a lateral tubular projection, a cup shaped member detachably secured to the bottom of said tubular body to serve as a reservoir, a reservoir pipe having one end located in said cup shaped member and extending up from the same and bent to extend into said lateral projection, an air blast pipe extending into said tubular body and also bent to extend into said lateral projection, and provided with a discharge orifice to coöperate with the discharge orifice of the reservoir pipe, and a supply pipe extending into said tubular body and to the cup shaped reservoir member attached thereto.

11. A device of the class specified, comprising a tubular body 4, having a lateral projection 6, a cup shaped member 12 screw threaded to the lower end of the body 4, a nozzle 13 screw threaded to the lateral projection 6, a cap 9 screw threaded to the top of the body 4, and a tapering member 10 within the cap 9.

12. A device of the class specified, comprising a tubular body 4, having a lateral projection 6, a cup shaped member 12 screw threaded to the lower end of the body 4, a nozzle 13 screw threaded to the lateral projection 6, a cap 9 screw threaded to the top of the body 4, a tapering member 10 within the cap 9, and air blast and reservoir pipes 16 and 7 respectively, extending through said projection 6 and into the interior of said nozzle.

13. The combination of an atomizer having a reservoir portion and a nozzle portion, and also provided with an aperture, of an air pipe and a reservoir pipe entering said aperture, a sheath pipe surrounding said pipes also entering said aperture, and means for supporting said reservoir from said pipe.

In witness whereof, I hereunto subscribe my name this 27th day of January A. D. 1911.

JULIAN G. GOODHUE.

Witnesses:
A. LYDA JONES,
HAZEL A. JONES.

---

Copies of this patent may be obtained for five cents each, by addressing the "Commissioner of Patents, Washington, D. C."